US012775532B2

(12) United States Patent
Li et al.

(10) Patent No.: US 12,775,532 B2
(45) Date of Patent: Oct. 27, 2026

(54) PCIe RETIMER PROVIDING FAILOVER TO REDUNDANT ENDPOINT USING INTER-DIE DATA INTERFACE

(71) Applicant: Kandou Labs SA, Saint-Sulpice (CH)

(72) Inventors: Jay Li, Saint-Sulpice (CH); Subhash Roy, Saint-Sulpice (CH)

(73) Assignee: Kandou Lab SA, Saint-Sulpice (CH)

( * ) Notice: Subject to any disclaimer, the term of this patent is extended or adjusted under 35 U.S.C. 154(b) by 0 days.

(21) Appl. No.: 19/128,697

(22) PCT Filed: Nov. 9, 2023

(86) PCT No.: PCT/US2023/079243
§ 371 (c)(1),
(2) Date: May 9, 2025

(87) PCT Pub. No.: WO2024/102915
PCT Pub. Date: May 16, 2024

(65) Prior Publication Data

US 2026/0186924 A1 Jul. 2, 2026

Related U.S. Application Data

(60) Provisional application No. 63/382,900, filed on Nov. 9, 2022.

(51) Int. Cl.
*G06F 11/00* (2006.01)
*G06F 11/20* (2006.01)

(52) U.S. Cl.
CPC ...... *G06F 11/2025* (2013.01); *G06F 11/2002* (2013.01)

(58) Field of Classification Search
CPC .......................... G06F 11/2025; G06F 11/2002
See application file for complete search history.

(56) References Cited

U.S. PATENT DOCUMENTS

| | | | | |
|---|---|---|---|---|
| 10,095,592 | B2 * | 10/2018 | Wang | G06F 11/2289 |
| 2014/0351654 | A1 * | 11/2014 | Zhang | G06F 11/2221 714/43 |
| 2018/0081761 | A1 * | 3/2018 | Arroyo | G06F 11/2007 |
| 2018/0101453 | A1 * | 4/2018 | Arroyo | G06F 11/2005 |
| 2025/0342133 | A1 * | 11/2025 | Roy | G06F 13/4045 |

* cited by examiner

*Primary Examiner* — Elmira Mehrmanesh

(57) ABSTRACT

Receiving, at an upstream pseudo-port of a first circuit die of a multi-die integrated circuit module (ICM), a plurality of serial data lanes associated with a PCIe data link, responsively generating respective deserialized lane-specific data words, providing the deserialized lane-specific data words for transmission via a downstream pseudo-port on the first circuit die of the multi-die ICM, the downstream pseudo-port having a PCIe data link to a first endpoint, responsive to a failure in the PCIe data link to the first endpoint, rerouting the deserialized lane-specific data words over an inter-die data interface using an in-ter-die adaptation layer protocol to a second circuit die of the multi-die ICM, receiving the deserialized lane-specific data words at the second circuit die from the inter-die data interface, and transmitting the deserialized lane-specific data words via a second downstream pseudo-port to a second endpoint via a second PCIe data link.

22 Claims, 10 Drawing Sheets

PCIe RETIMER PROVIDING FAILOVER TO REDUNDANT ENDPOINT USING INTER-DIE DATA INTERFACE

CROSS-REFERENCE TO RELATED APPLICATIONS

This application is a 35 U.S.C. 371 of International Application PCT/US23/79243, entitled "PCIe Retimer Providing Failover to Redundant Endpoint Using Inter-Die Data Interface", filed Nov. 9, 2023, which claims the benefit of U.S. Provisional Application No. 63/382,900, filed Nov. 9, 2022, entitled "PCIe Retimer Providing Failover to Redundant Endpoint Using Inter-Die Data Interface", all of which are hereby incorporated herein by reference in its entirety for all purposes.

BACKGROUND

With increased data rate in PCIe 5.0 (32 Gbps) compared to previous generations (e.g., PCIe 4.0 MAX 16 Gbps), the channel reach becomes even shorter than before, and the need for retimers becomes more evident. Typical channels comprise system boards, backplanes, cables, riser-cards and add-in cards. Connections across these kinds of channels-often combinations of these channels and their sockets-usually have losses that exceed the specified target loss of −36 dB at 16 GHz. Retimers extend the channel reach to get across the border to what is possible without a retimer.

Retimers break a link between a host (root complex, abbreviated RC) and a device (end point) into two separate segments. Thus, a retimer re-establishes a new PCIe link going forward, which includes re-training and proper equalization implementing the physical and link layer.

While redrivers are pure analog amplifiers that boost the signal to compensate for attenuation, they also boost noise and usually contribute to jitter. Retimers instead comprise analog and digital logic. Retimers equalize the signal, retrieve their clocking, and output a signal with high amplitude and low noise and jitter. Furthermore, retimers maintain power states to keep system power low.

Retimers were first specified in PCIe 4.0. For PCIe 5.0, the usage of retimers is expected. FIGS. 1 and 2 show typical applications for retimers, in accordance with some embodiments. In FIG. 1, one retimer is employed. The retimer is located on the motherboard, and logically the retimer is between the PCIe root complex (RC) and the PCIe endpoint.

FIG. 2 shows the usage of two retimers. The first retimer is similarly located on the motherboard, while the second retimer is on a riser card which makes the connection between the motherboard and the add-in card containing the PCIe endpoint.

In complex PCIe systems, the number of PCIe endpoints can be significantly higher than the number of free PCIe ports. In such scenarios, switch devices may be used to extend the number of PCIe ports. Switches allow for connecting several endpoints to one root point, and for routing data packets to the specified destinations rather than simply mirroring data to all ports. One important characteristic of switches is the sharing of bandwidth, as all endpoints share the bandwidth of the root point.

BRIEF DESCRIPTION

Methods and systems are described for receiving, at a plurality of upstream serial data transceivers of a first circuit die of a multi-die integrated circuit module (ICM), a plurality of serial data lanes associated with a PCIe data link, and responsively generating respective deserialized lane-specific data words, providing the deserialized lane-specific data words for transmission via a group of downstream serial data transceivers on the first circuit die of the multi-die ICM, the group of downstream serial data transceivers having a PCIe data link to a first endpoint, responsive to a failure in the PCIe data link to the first endpoint, rerouting the deserialized lane-specific data words over an inter-die data interface using an inter-die adaptation layer protocol to a second circuit die of the multi-die ICM, receiving the deserialized lane-specific data words at the second circuit die from the inter-die data interface, and transmitting the deserialized lane-specific data words via a second group of downstream serial data transceivers to a second endpoint via a second PCIe data link.

This Brief Summary is provided to introduce a selection of concepts in a simplified form that are further described below in the Detailed Description. This Brief Summary is not intended to identify key or essential features of the claimed subject matter, nor is it intended to be used as an aid in determining the scope of the claimed subject matter. Other objects and/or advantages of the present invention will be apparent to one of ordinary skill in the art upon review of the Detailed Description and the included drawings.

DETAILED DESCRIPTION

Figure 1:
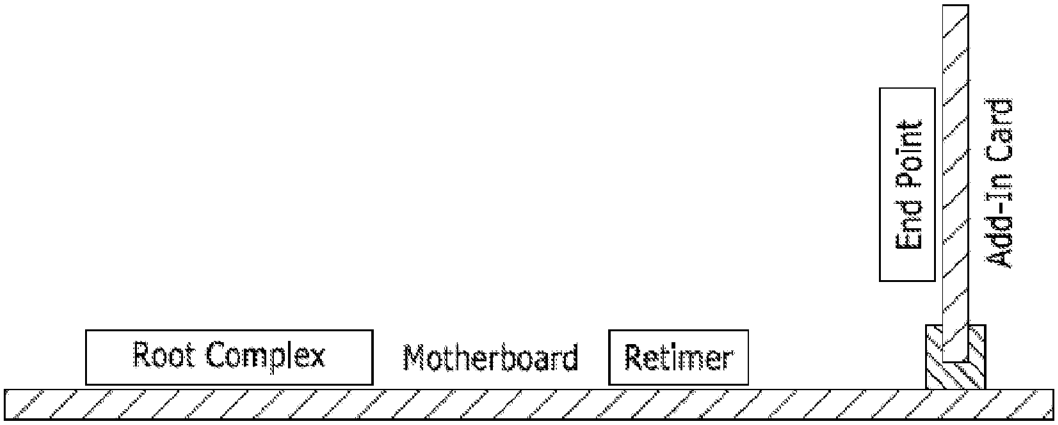
FIGS. 1 and 2 illustrate two usages of retimers, in accordance with some embodiments.
Figure 2:
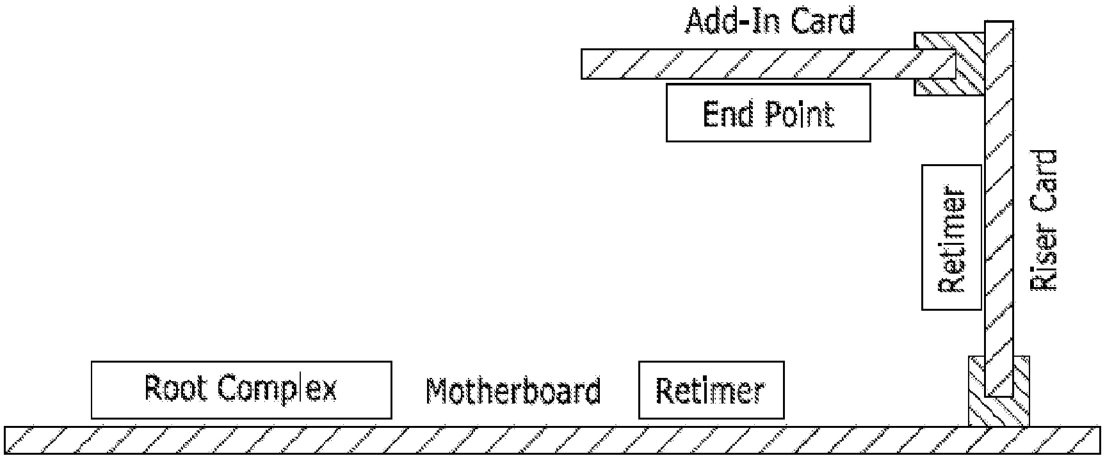

Despite the increasing technological ability to integrate entire systems into a single integrated circuit, multiple chip systems and subsystems retain significant advantages. For purposes of description and without limitation, example embodiments of at least some aspects of the invention herein described assume a systems environment of at least one point-to-point communications interface connecting two integrated circuit chips representing a root complex (i.e., a host) and an endpoint, (2) wherein the communications interface is supported by several data lanes, each composed of four high-speed transmission line signal wires.

Retimers typically include PHYs and retimer core logic. PHYs include a receiver portion and a transmitter portion. A receiver in the PHY receives and deserializes data and recovers the clock, while the transmitter in the PHY serializes data and provides amplification for output transmission. The retimer core logic performs deskewing (in multi-lane links) and rate adaptation to accommodate for frequency differences between the ports on each side.

Since the retimer is located on the path between a root complex (e.g., a CPU) and an end point (e.g., a cache block) the retimer adds additional value. An integrated processing unit, e.g., an accelerator, may be integrated into the retimer performing data processing on the path from the root complex to the end point.

To allow for a highly flexible solution, the PCIe retimer has normal PHY interfaces towards the PCIe bus and a high-speed die-to-die (D2D) interconnect towards a data processing unit (DPU). The high-speed die-to-die interconnect allows for very high-speed communication links between chiplets in the same package. The PCIe retimer circuit is a chiplet, a die, with a four-lane retimer and the capability to connect to a DPU chiplet via the high-speed die-to-die interconnect. One, two or four lanes can be bundled into a multi-lane link where data is spread across all of the links. It is also possible to configure each lane individually to form a single-lane link. In the PCIe retimer, each lane employs two PHYs, one on each end (up- and downstream ports). Considering four lanes, eight PHYs are used in one PCIe retimer die. The PCIe retimer die also contains communication lines which allow for exchanging control information between two or more PCIe retimer dies.

The following can be built using one (or more) PCIe retimer chiplet(s). These are discussed in more detail below:

- 4-lane retimer
  - Single die, with full flexible 4×4 static lane routing
- 4-lane retimer with accelerator (DPU)
  - Two dies in one package, a retimer die and a DPU die
- 8-lane retimer
  - Two dies in one package, limited static lane routing—flexible 4×4 routing on same die but no data crossing die boundaries
- 8-lane retimer with full flexible lane routing
  - Two dies in one package, data crossing chiplets are routed through high-speed die-to-die interconnect at the cost of additional delay.
- 8-lane retimer with accelerator (DPU)
  - Three dies in package, two retimer dies and a DPU die
- 16-lane retimer
  - Four dies in one package, limited static lane routing—flexible 4×4 routing on same die but no data crossing die boundaries Multi-Die ICM with Failover to Redundant Endpoint Via D2D Redundancy is a feature of many electronic systems, often utilized to ensure system reliability and continued functionality should a key component or hardware device fail. In the event of a failure, redundant systems and/or hardware devices may take over until repairs may be made on the primary system and/or hardware devices. In some environments, repairs are infrequent and occur on a schedule, such as in the case of data centers submerged in water. In such environments, redundancy may ensure correct operation until the next scheduled maintenance, and may reduce the frequency of emergency maintenance.

Figure 3:
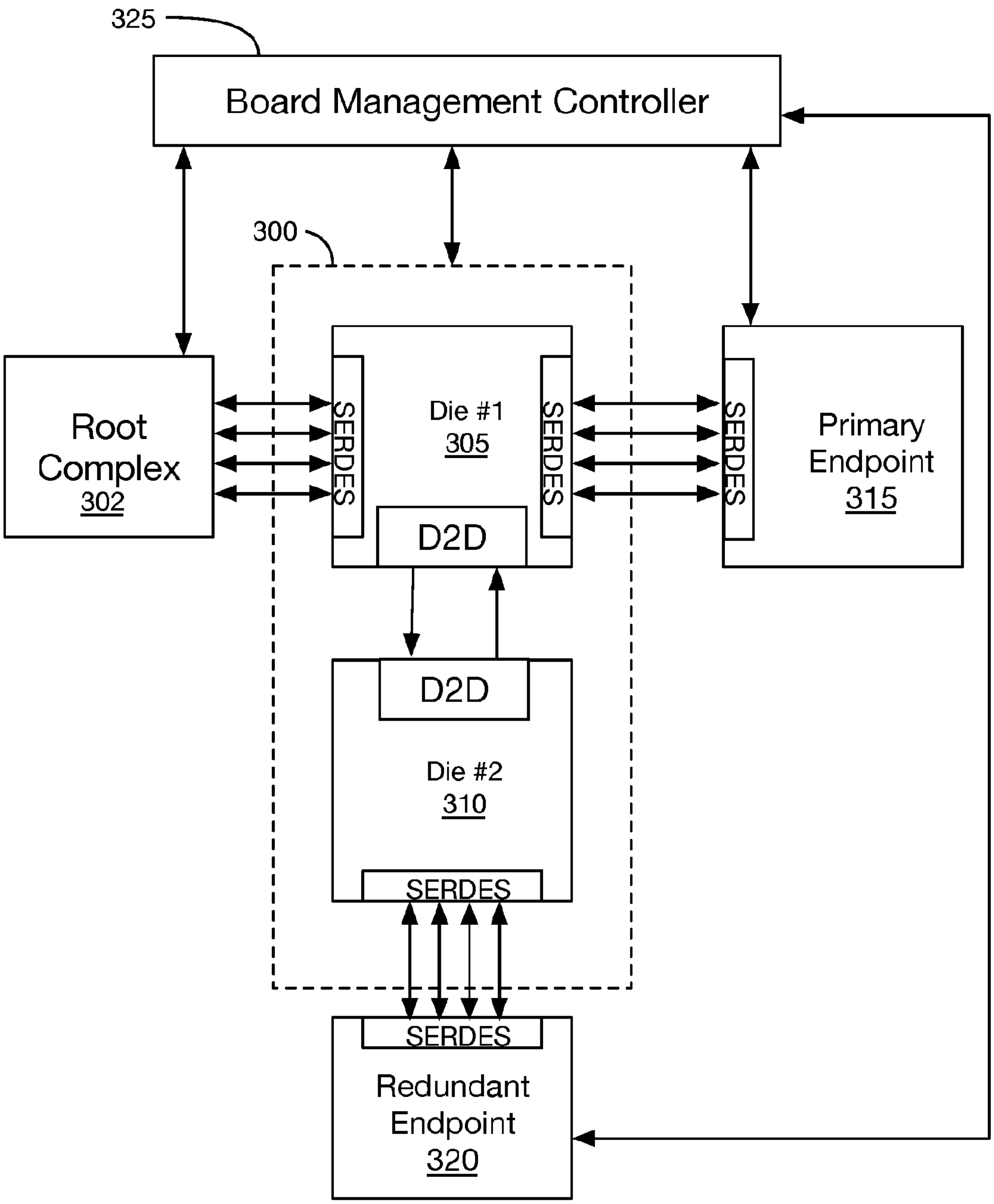
FIG. 3 is a block diagram of a chip configuration of a multi-die integrated chip module (ICM) for providing failover to a redundant endpoint using a high-speed die-to-die (D2D) interconnect, in accordance with some embodiments.

FIG. 3 is a block diagram of a chip configuration for a multi-die ICM 300, in accordance with some embodiments. As shown, a plurality of serial data lanes associated with a PCIe data link are received at a plurality of upstream serial data transceiver PHYs of an upstream pseudo-port of a first circuit die 305. The plurality of upstream serial data transceiver PHYs convert the received serial data lanes into respective deserialized lane-specific data words. Circuit die 305 is configurable to route the deserialized lane-specific data words to a first endpoint 315 or a second endpoint 320. In at least one embodiment, the first endpoint 315 is a primary endpoint while second endpoint 320 is a redundant endpoint. The deserialized lane-specific data words are routed on a PCIe data link to the primary endpoint 315 using a group of downstream serial data transceiver PHYs of a downstream pseudo-port in the first circuit die 305. Responsive to a failure in the PCIe data link to the primary endpoint 315, the deserialized lane-specific data words are rerouted over an inter-die data interface using an inter-die adaptation layer protocol to the second circuit die 310 of multi-die ICM 300. The deserialized lane-specific data words are received at the second circuit die from the D2D interface and transmitted via a group of downstream serial data transceiver PHYs of a downstream pseudo-port on the second circuit die to the second endpoint 320 using a second PCIe data link.

FIG. 3 includes a Board Management Controller (BMC) 325. BMCs may be included on e.g., motherboards to monitor the state of components and hardware devices on the motherboard utilizing sensors, and communicating the status of such devices e.g., to the root complex. BMCs may be employed in e.g., server room/data center applications and may be remotely managed by administrators to access information about the overall system. Some monitoring functions of a BMC include temperature, humidity, power-supply voltage, fan speeds, communications parameters, and operating system functions. The BMC may notify the administrator if any of the parameters exceed a threshold and the administrator may take action. In some embodiments, the BMC may be preconfigured to take certain actions in the event that a parameter exceeds a threshold, such as (but not limited to) executing a sequence to switch to a redundant endpoint in the event of a failure in the primary endpoint. In some embodiments, the BMC 325 monitors the status of the PCIe link between the first circuit die 305 and the primary endpoint 315. In such embodiments, monitoring the status of the PCIe link includes bit error rate measurements, for the upstream and downstream data paths. The bit error rate exceeding a threshold value may indicate a failure in the PCIe link on one or more lanes, which may initiate a link retraining sequence between circuit die 305 and endpoint 315. If consecutive link retraining sequences fail, a fatal failure in the PCIe link may be present, and the multi-die ICM 300 may establish a link between the Root Complex 302 and the Redundant Endpoint 320 utilizing the D2D interface. In such an embodiment, routing logic in the first and second circuit dies 305 and 310, respectively, may be configured to reroute the traffic from the downstream serial data transceivers on the first circuit die 305 over the D2D interface using a D2D adaptation layer protocol, described in more detail below. The second circuit die 310 will route the inbound traffic received by the D2D adaptation layer to downstream serial data transceivers on the second circuit die for transmission to the redundant endpoint 320. From there, normal operation may continue until e.g., routine service is performed on the system and functionality for a PCIe link to the primary endpoint is restored. In some embodiments, the configuration status of the multi-die ICM 300 may indicate the point of a failure, and thus such configuration settings may be accessed and read by e.g., the BMC 325, Root Complex 302, or other diagnostic equipment to assess systems and/or hardware devices in need of repair. In such embodiments, the configuration status may be obtained via e.g., the SMBus between devices, or may be conveyed utilizing control skip ordered sets as vendor-defined messages (VDMs).

The BMC may be configured to provide instructions to the CPU in the leader tile of the ICM 300. Such instructions may be provided e.g., over a SMBus connection, or various other point-to-point connections. The instructions may be associated with a root complex-to-endpoint mapping, and the CPU of the leader tile may configure the lane routing logic on the leader tile as well as the follower tile to map the upstream pseudo-ports to the downstream pseudo-ports associate with the mapping instruction issued by the BMC. In some embodiments, configuring the lane routing logic comprises modifying configuration register space in both circuit dies, where the configuration register space includes control signal values provided as selection signals to the multiplexing devices in the lane routing logic. In some embodiments, as described below, upstream pseudo-ports have static mapping configurations to the adaptation layer ports. For example, the upstream pseudo-port PHY1 in FIG. 6 may be statically mapped to adaptation layer port 1 in the Tx-portion of the adaptation layer on the leader circuit die. The downstream pseudo-ports on the follower circuit die may be selectively connected to any one of the adaptation layer ports 0-7, depending on the root complex-to-endpoint mapping. In some embodiments, the downstream pseudo-ports may be statically mapped to the adaptation layer ports while the upstream pseudo-ports are configurable to be connected to any adaptation layer port, and vice versa.

In some embodiments, the failure in the PCIe link to the Primary Endpoint 315 may be associated with the connections between the multi-die ICM 300 and the Primary Endpoint 315, e.g., traces on a PCB. In some embodiments, the Primary Endpoint 315 may have a fault in any one of its components and may need to be replaced during the next maintenance. In some embodiments, the primary endpoint 315 may report e.g., temperature fluctuations that exceed a threshold or a bit error rate falling below a threshold to the BMC 325, and the BMC may responsively initiate the sequence of bringing up the redundant endpoint. Such a sequence may occur with or without administrator input, and may include reconfiguring the lane routing logic in the multi-die ICM via a command over the SMBus that initiates the active CPU core in the leader circuit to write to the configuration register space associated with the lane routing logic in the leader and the follower circuit dies to route the data over the D2D interface to the follower circuit die.

Figure 4:
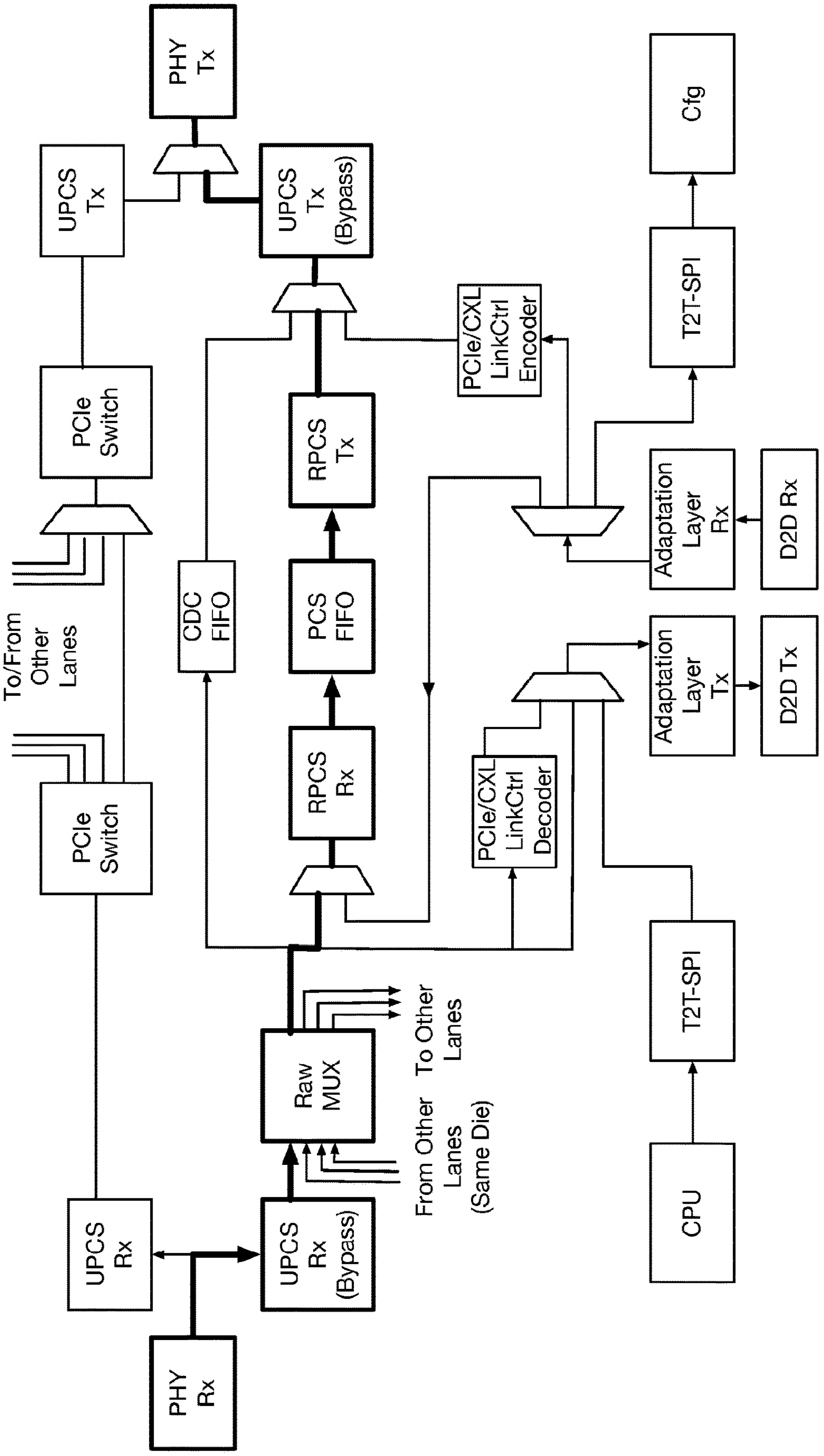
FIG. 4 is a data flow diagram of a multi-die ICM operating in a retimer mode where data lanes are routed within the same die, in accordance with some embodiments.

FIG. 4 is a data flow diagram that may be used for the PCIe data link to the first endpoint 315, in accordance with some embodiments. As shown, serial data is received at the PHY in the upstream pseudo-port, which includes a deserializer configured to convert the serial data stream into e.g., 32-bit deserialized lane-specific data words. The data words are routed via the lane routing logic to retimer core logic. In some embodiments, the core logic includes a PCS decoding block configured to perform e.g., 8b10b or 128b130b decoding prior to being stored in a retimer FIFO. The retimer FIFO includes lane deskewing and rate adaptation functionalities across multiple lanes within a given circuit die as well as between lanes across multiple different circuit dies. The lane-specific data words are read from the retimer FIFO and transmitted on the downstream serial data transceivers via the transmitter in the PHY of the downstream pseudo-port.

Figure 5:
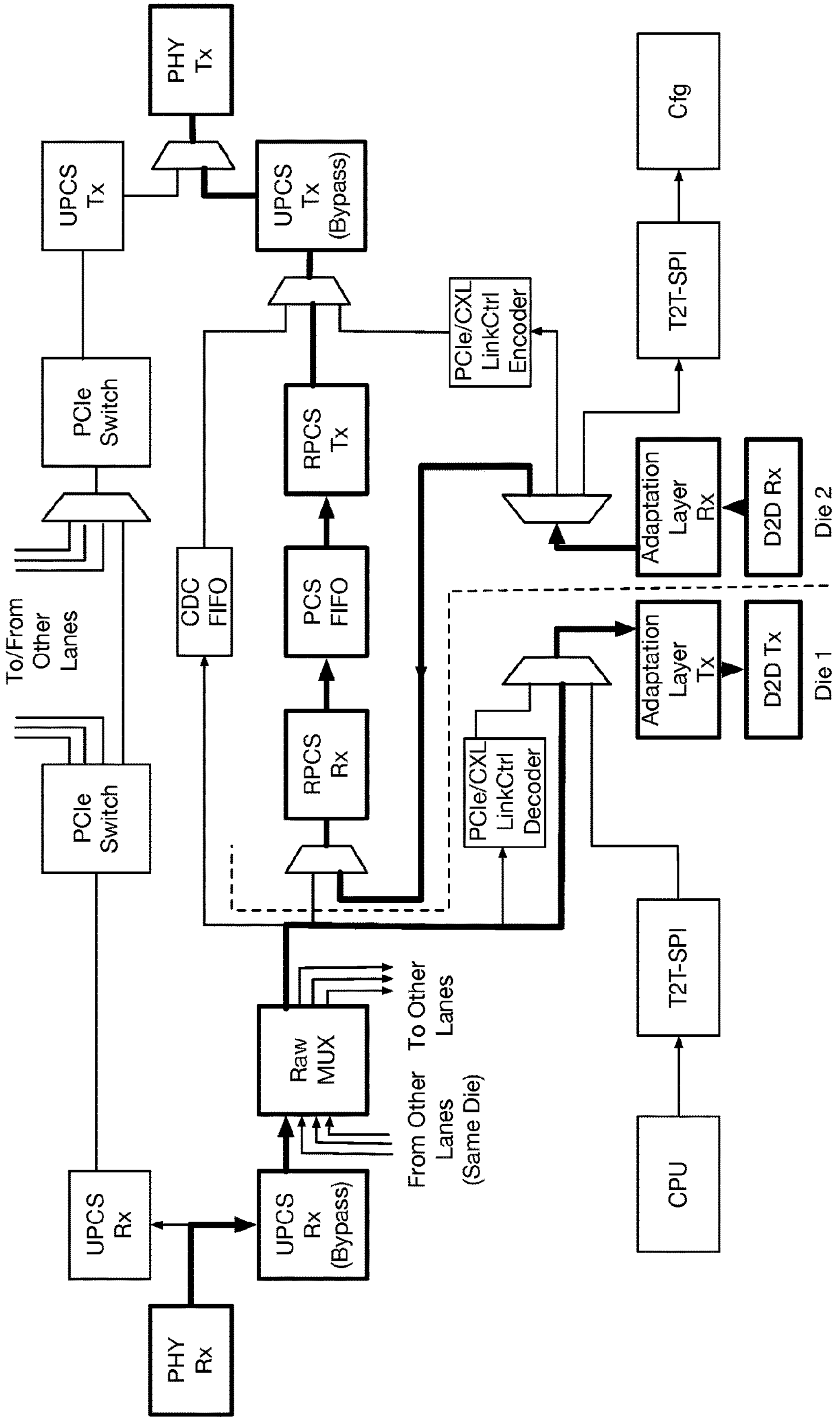
FIG. 5 is a data flow diagram of a multi-die ICM operating in a retimer mode where data lanes are routed between circuit dies using a D2D interconnect, in accordance with some embodiments.

FIG. 5 is a data flow diagram that may be used for the PCIe data link to the second endpoint 320 using the D2D interface. Specifically, FIG. 5 illustrates data received over a set of serial data transceivers and provided to a second circuit die via the inter-die data interface (e.g., the adaptation layer and inter-die transmitter). In FIG. 5, data is received at a PHY of a first circuit die. The data is deserialized and routed using lane routing logic to the adaptation layer on the first circuit die, which formats the raw data for transmission using the D2D interface. The data is received at the adaptation layer on the second circuit die, which performs the reciprocal formatting to provide the data to the destination lanes on the second circuit die. The data is provided to the RPCS logic to perform rate adaptation and lane-to-lane deskew before being output on the serial data transceiver PHYs of the second circuit die to the endpoint. A similar data path exists in the reverse direction from the endpoint to the root complex.

In FIGS. 4 and 5, RPCS logic is shown which may include e.g., the 8b10b encoding/decoding functions of PCIe generations 1 and 2 and the 128b/130b encoding/decoding functions of PCIe generations 3-5. Embodiments described herein further contemplate PCIe generation 6, which utilizes a flow control unit (FLIT) scheme, and thus no 8b10b or 128b130b is implemented. In such embodiments, the functionalities for encoding/decoding may be omitted, while additional functionalities specific to PCIe 6, such as FEC decoding (either partial or full) are included as logic in the data path. Some functionalities of retimer core logic are shared, such as lane-to-lane deskewing and rate adaptation in the FIFO.

Figure 6:
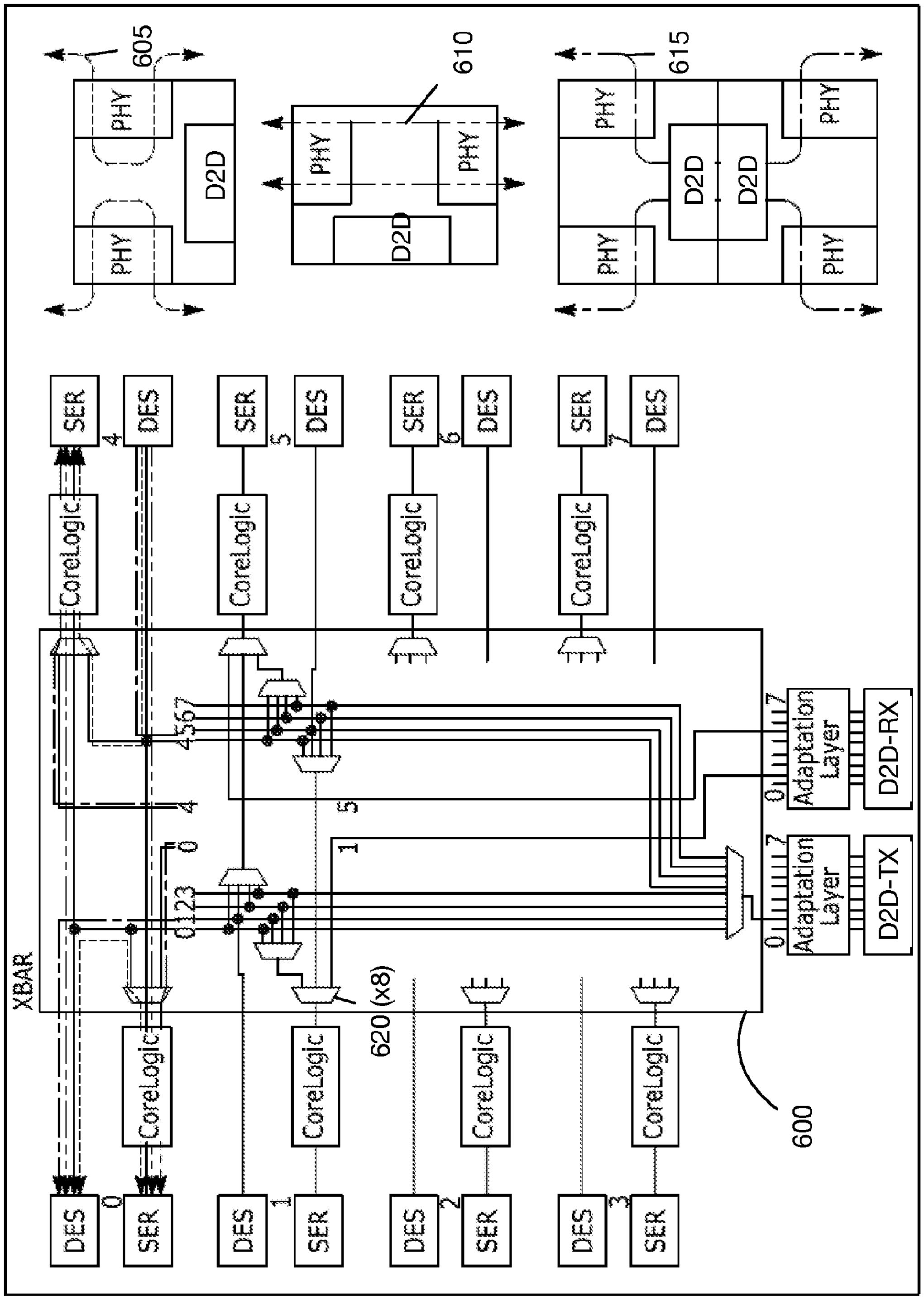
FIG. 6 is a block diagram of a crossbar multiplexing switch for performing data lane routing, in accordance with some embodiments.

FIG. 6 is a block diagram of lane routing logic 600 in a retimer circuit die of an ICM, in accordance with some embodiments. FIG. 6 includes a block diagram on the left and various lane routing configurations on the right. The top lane routing configuration 605 depicts a loopback mode, where data is received at a PHY, deserialized, and provided through the core routing logic before being serialized and output via the same PHY back to the originating source. The middle configuration 610 corresponds to the data path shown in FIG. 4, in which data stays on the same die. As shown, data is received at a first PHY, processed in the core routing logic and provided to a second PHY. The lane routing configuration 615 corresponds to the data path shown in FIG. 5, in which data is received at PHYs in a first circuit die, directly forwarded to the high-speed die-to-die interconnect, and output via PHYs on a second circuit die. In all such scenarios, there are data paths in the opposite direction as well.

FIG. 6 further illustrates the multiplexing capabilities of the lane routing logic. Any given PHY may be configured to receive data from any of the eight lanes. Additionally, data can be obtained from the D2D data interface. FIG. 6 illustrates multiplexing for one lane to the inter-die data interface, however it should be noted that equivalent multiplexing circuitry is included for all of the PHYs. Any input PHY can be select for each adaptation layer port in the adaptation layer for transport over the high-speed die-to-die interconnect. Some embodiments may mirror data by selecting the same upstream PHY data for multiple adaptation layer physical ports such that the traffic received by the upstream PHY is duplicated on multiple downstream PHYs of different pseudo-ports.

Switching a data path in the routing logic includes the 32-bit received data bus carrying the deserialized lane-specific data words, accompanying data enabled lines, the recovered clock, and the corresponding reset. It is important to note that only raw data is multiplexed, the received data is not processed in any way. The Raw MUX logic is statically configured to route data via configuration bits. In case the Raw MUX settings are changed during mission mode, invalid data and glitches on the clock lines are likely. Thus, the multiplexing logic setup is configured during reset.

Figure 9:
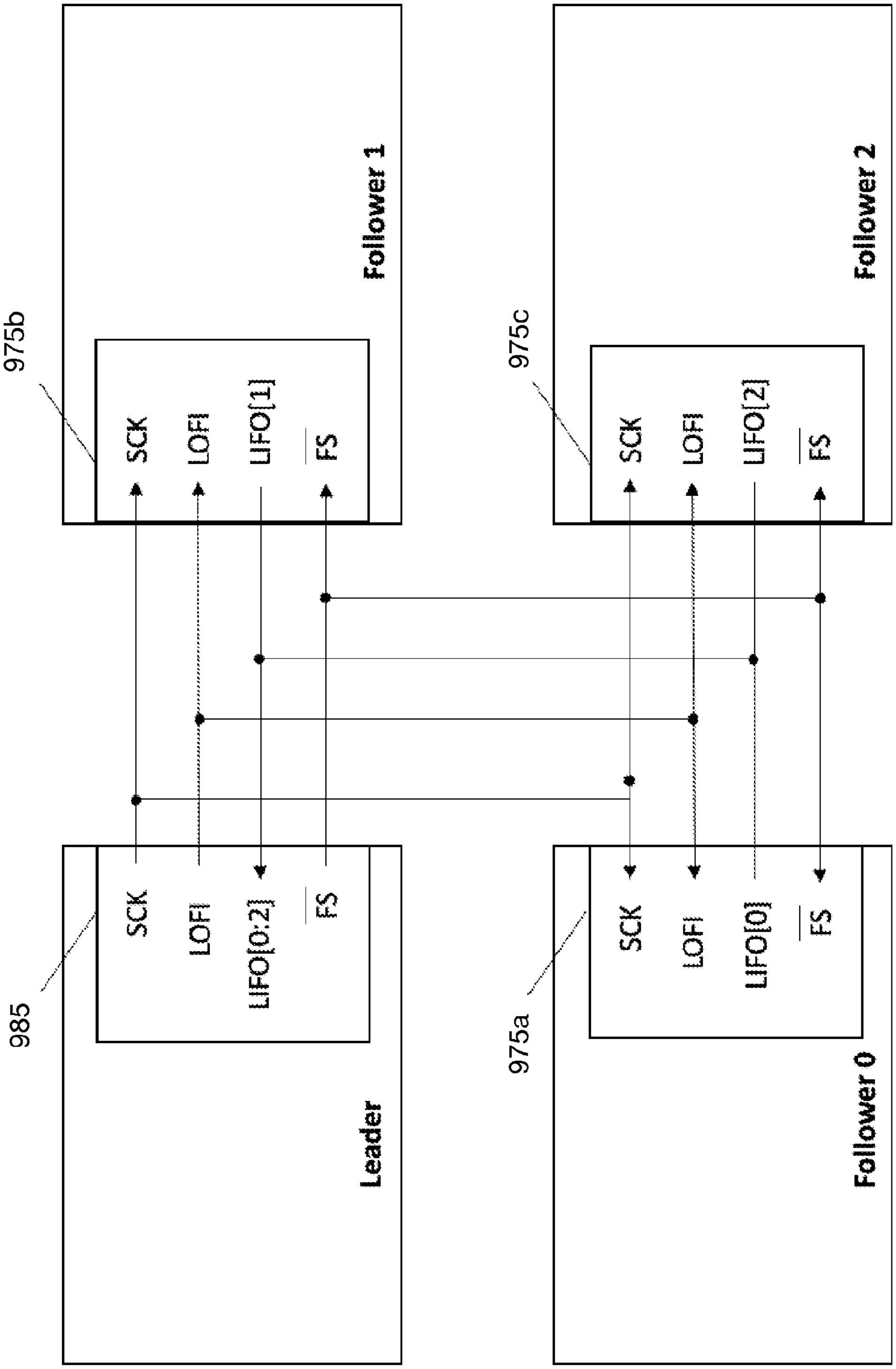
FIG. 9 is a block diagram illustrating the configuration of the tile-to-tile (T2T) Serial Peripheral Interface (SPI) bus in a four-tile embodiment.
Figure 10:
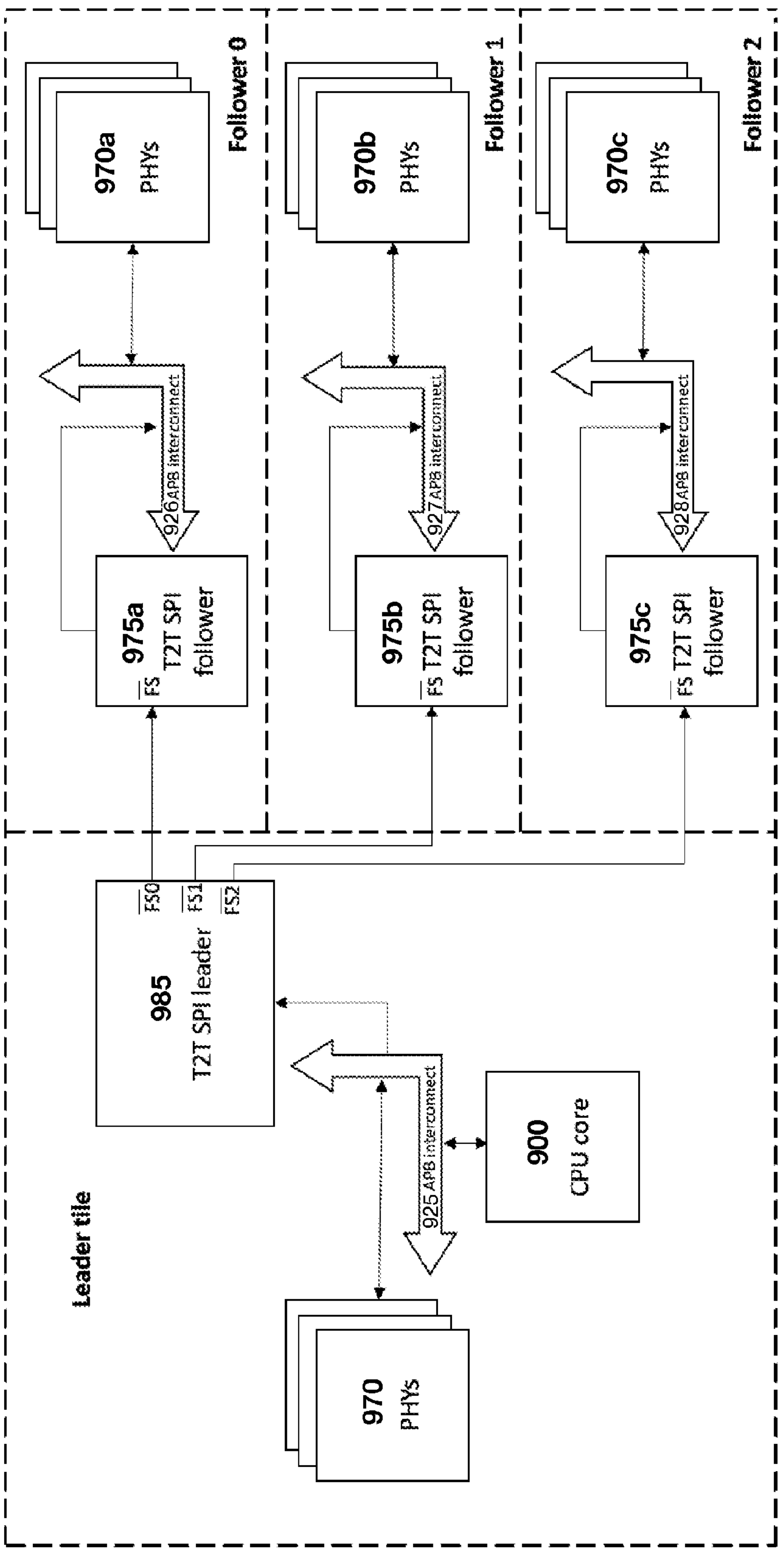
FIG. 10 is a block diagram illustrating a complete signal path between central processing unit (CPU) core 900 and each PHY on the various tiles in the multi-chip module.

In some embodiments, each circuit die includes lane routing logic such as the Raw MUX for lane routing between upstream and downstream pseudo-ports either on the same die or on different circuit dies. In such an embodiment, a primary circuit die, also referred to as a "leader" may perform the configuration of the Raw MUX in each circuit die, e.g., by writing to the configuration registers associated with the Raw MUX. FIGS. 9 and 10 illustrate such tile-to-tile communications. FIG. 9 provides a schematic of the configuration of the T2T SPI bus in the four-tile case. This specific number of tiles is not limiting as the principles described herein can be extended to a N tile retimer having one leader tile and N−1 follower tiles, N≥2.

interconnects 926, 927, 928. Each SPI follower 975*a*, 975*b*, 975*c* is leader on the respective APB interconnect 926, 927, 928. This enables each SPI follower to access all registers that are located on the tile that the SPI follower is also located on.

Communication between tiles thus makes use of two distinct busses and protocols. SPI protocol does not support addressing, but the APB protocol does. Part of the data put onto the T2T SPI bus by CPU core 900 is APB address information, to enable the local APB interconnect on each follower tile to route messages to the intended recipient PHY.

Each PHY is assigned a unique APB address or APB address range so that it is possible for CPU core 900 to write to and/or read from one specific PHY on any tile. From the perspective of the CPU core 900, the entire multi-tile module has a single address space that includes separate regions for each PHY.

Assuming for the sake of illustration 24-bit APB addresses and a 32-bit data word size, control information put onto the SPI bus can be of the following format. This is referred to herein as a 'control packet'.

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| r | r | r | r | r | s | s | s | a | a | a | a | a | a | a | a | a | a | a | a | a | a | a | a | a | a | a | a | a | a | a | a |

The T2T SPI leader 985 includes a serial clock line SCK that carries a serial clock signal generated by T2T SPI leader 985. The SCK signal is received by all T2T SPI followers and is used to co-ordinate reading and writing of data over the T2T SPI bus.

T2T SPI leader 985 also includes a MOSI line (Leader Out Follower In) and MISO line (Leader In Follower Out). The MOSI line is used to transmit data from the leader to the follower, i.e. as part of a write operation. The MISO line is used to transmit data from the follower to the leader, i.e. as part of a read operation.

T2T SPI leader 985 further includes a $\overline{FS}$ line (Follower Select). This is used to signal which follower is to participate in the current operation of the bus—that is, which follower data or a command on the bus is intended for. For convenience a single wire is shown for the follower select line in FIG. 9 but in practice one wire can be present for each line, i.e. three separate follower select wires in the case of FIG. 9.

T2T SPI followers 975*a*, 975*b* and 975*c* are each also coupled to all of the lines discussed above to enable two-way communication between the T2T leader and follower. In this manner, communication between tiles is achieved.

FIG. 10 shows the complete signal path between CPU core 900 and each PHY on the various tiles in the multi-chip module.

CPU core 900 is connected to PHYs 970 on the leader tile via leader tile APB interconnect 925 and can thus communicate with PHYs 970 via APB interconnect 925. CPU core 900 is also connected to T2T SPI leader 985 via leader tile APB interconnect 925. T2T SPI leader 985 is part of the T2T SPI bus that enables CPU core 900 to communicate with other tiles.

As shown in FIG. 10, each follower tile includes a respective T2T SPI follower 975*a*, 975*b*, 975*c*. Each of these SPI followers is coupled to T2T SPI leader 985 to enable signaling between tiles.

Each SPI follower 975*a*, 975*b*, 975*c* is coupled to respective PHYs 970*a*, 970*b*, 970*c* via respective follower tile APB Bits 0-23 are address bits ('a'), bits 24, 25 and 26 are follower select bits and bits 27-31 are reserved bits ('r'). In this particular case there are three follower select bits because there are three followers tiles (and hence three T2T SPI followers) in this example. The reserved bits provide space for additional follower select bits—in this case, up to eight follower select bits can be provided, supporting up to eight follower tiles. The principles established here can be extended to any number of follower tiles by increasing the word size.

The address bits form an APB address. The T2T-SPI followers are each configured as bus leader on their respective local APB interconnects, enabling each T2T-SPI follower to instruct its respective APB interconnect to perform a write or read operation to one of the respective PHYS the APB bus is coupled to. In some cases the address data can be omitted because the T2T-SPI bus can auto-increment addresses such that it already knows which address to write data to or read data from. The address data can be provided to the local APB interconnect after receipt of the control packet by the respective T2T SPI follower, enabling the local APB interconnect to route commands and data to the correct local PHY.

The follower select bits enable the control packet to specify which follower select line should be activated, i.e. which tile data is to be written to or read from. The T2T SPI bus uses the follower select bits to control the follower select lines $\overline{FS_1}$, $\overline{FS_2}$, $\overline{FS_3}$, where e.g. a 0 indicates the corresponding follower select line should be low and a 1 indicates a corresponding follower select line should be high.

Follower select control information can alternatively be sent separately from the APB address data. The follower select information could be sent in-band as illustrated above, or another channel could be used such as a System Management bus (SMBus). The address data can be sent separately and before the data package is transmitted. In some cases the address data can be omitted because the T2T SPI bus can auto-increment addresses such that it already knows which address to write data to.

In either case, once the follower select and address information (if required) has been provided, data can be transmitted. The T2T SPI leader 985 can keep the follower select line(s) asserted until it receives new instructions regarding follower select line configuration. Similarly, the relevant APB interconnect(s) can continue writing to the address(es) specified (possibly by auto-incrementing) until new addressing information is provided. In this way, data and commands can be transmitted to, and received from, any PHY on any tile.

The APB address space is a global address space across all tiles. This means it is possible to address any register on any tile via this global address space. One particular configuration provides a base address for each tile that is given by a tile identifier multiplied by a constant. The tile identifier can be a tile number and the constant can be a base address for the leader tile. Other memory space constructions are possible. Each register on each tile has a unique address or address range assigned to it within this global address space. Each PHY of PHYs 970, 970*a*, 970*b*, 970*c* thus has a unique address or address range assigned to it.

The CPU core on the leader tile may coordinate the lane switching circuits in both tiles. The CPU core on the follower tile may be in a low power state. As shown, a SPI communications bus between the two tiles may be used to configure the switching circuit in the follower tile to select between the first and second sets of downstream serial data transceiver ports. In some embodiments, a die-to-die (D2D) interface may be present and configured to configure lane routing between the leader and follower tiles. I.e., serial data streams received on upstream ports of the leader tile may be routed to downstream ports of the follower tile and vice versa. Such a D2D interface may also be configured to carry configuration information as sideband information from the leader tile to the follower tile, e.g., to configure the configuration registers of the follower tile. In another embodiment, the configuration of the raw crossbar MUX may be performed via a system management bus, which may be further connected to the root complex. In some embodiments, a virtual channel between the root complex and retimer chip may be used for configuration purposes. In such embodiments, vendor-defined messages (VDMs) may be present in particular vendor-defined packet fields of a PCIe data transmission. Such VDMs may be detected, extracted, and provided to the CPU of the leader circuit die using e.g., an interrupt protocol. While FIG. 7 includes a single follower tile, it should be noted that additional follower tiles may be included, in some embodiments up to three follower tiles. In such a scenario, each follower tile may have a specific tile ID, and configuration register write commands can be assigned to certain tile IDs.

In some embodiments, the leader tile may initialize the configuration registers of the Raw MUX of the follower tile such that the RX adaptation layer ports are statically mapped to downstream ports to the redundant endpoint. In such an embodiment, the leader tile can switch the routing of the deserialized lane-specific data words between (i) downstream ports on the same die to the primary endpoint and (ii) the adaptation layer to be routed via the D2D interface.

In some embodiments, the rerouting of the deserialized lane-specific data words over the D2D interface occurs responsive to a failure with the PCIe link to the primary endpoint. Such a failure in the link may be associated with a failure in the primary endpoint itself, and thus the settings of the configuration registers of the circuit dies in the ICM may be useful for diagnostic purposes. For example, the root complex and/or ICM may obtain and provide configuration parameters indicating that the PCIe data link to the spare endpoint has been activated, thus indicating that repairs may be needed by either the primary endpoint itself, or by a portion of the PCIe data link to the primary endpoint. In such a scenario, the primary endpoint may be repaired or replaced and the ICM be configured to reactivate the PCIe data link to the primary endpoint.

Figure 7:
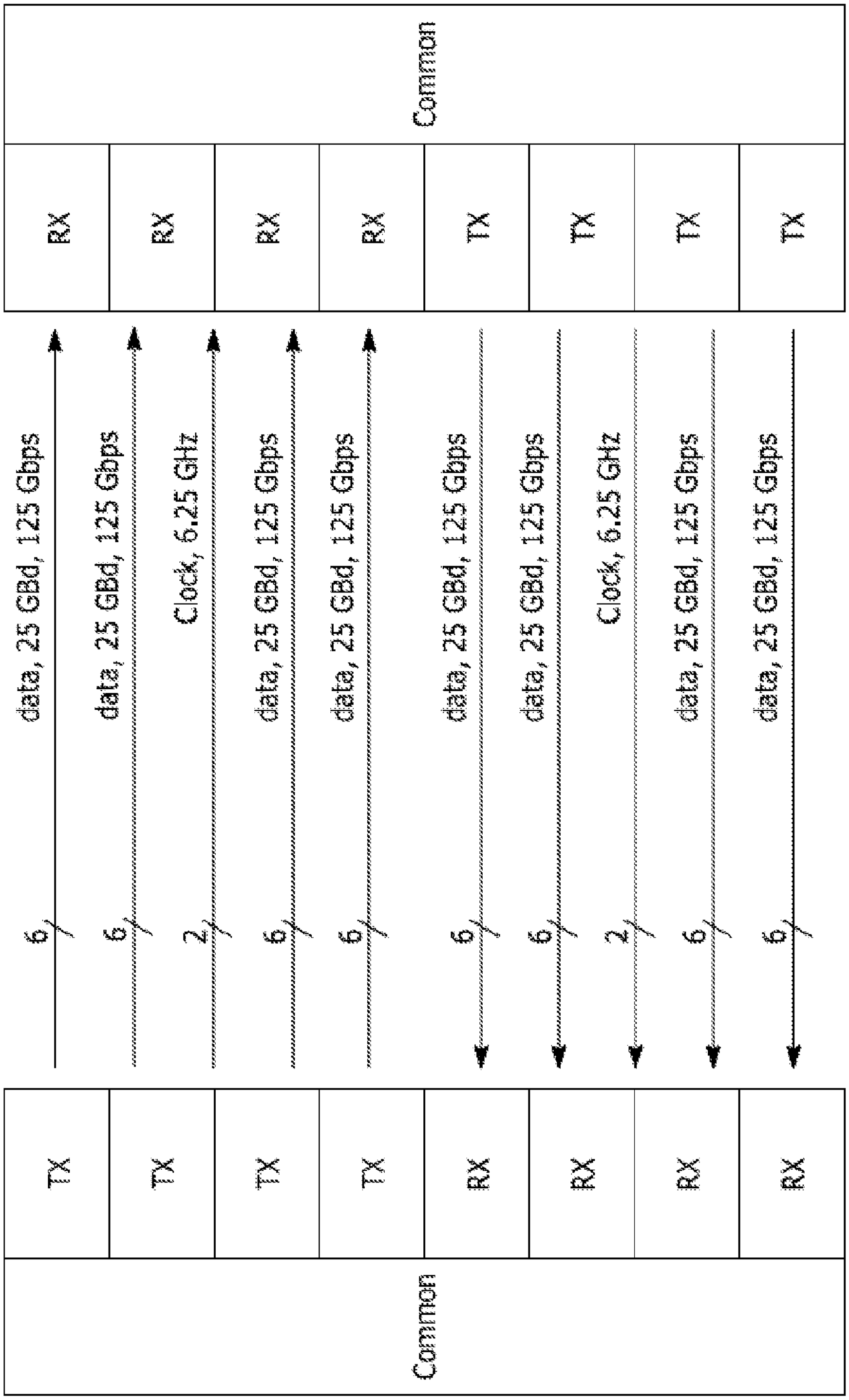
FIG. 7 is a diagram of a D2D interconnect, in accordance with some embodiments.

FIG. 7 is a block diagram of an inter-die data interface (also referred to herein as a high-speed die-to-die (D2D) interconnect, "D2D link" and the like), in accordance with some embodiments. As shown, the D2D link utilizes eight high-speed die-to-die (D2D) data flows, four in each direction, each D2D data flow operating at a rate of 25 GBd, transmitting 5 bits over 6 wires for a total throughput of 125 Gbps. In some embodiments, each D2D data flow utilizes orthogonal differential vector signaling (ODVS) encoding to encode the 5 bits into 6 bits for transmission over the 6 wires. Furthermore, the interface includes two differential clock lanes operating at 6.25 GHz. It should be noted that interconnects having alternative sizes, throughputs, and/or encoding methods may be utilized as well.

As shown, each D2D data flow has a raw bandwidth of up to 125 Gbps without using forward error-correction (FEC). With the FEC enabled, the bandwidth is 125 Gbps*150/160=117,1875 Gbps. In some embodiments, the PCIe retimer operates the high-speed die-to-die interconnect using low latency FEC and scrambling. In this configuration, 150 bits of data are transmitted each clock period for each data flow. The clock frequency may depend on the link speed. At 125 Gbps, the core clock is 125 Gbps/(5*32) =781.25 MHz. The 150 bits of data send at one end of the link are aligned at the receiving end, i.e., TX bit0 is received as RX bit0. The 150 bits of data in a clock cycle is referred to as a 'word'.

The inter-die data interface is operated using the same 100 MHz reference clock as the PHYs. In some embodiments, the interface is configured through the APB interface with an 8-bit wide data bus. In some embodiments, the interface may be configured to operate at a lower speed to reduce power. Furthermore, the number of enabled TX/RX data flows may be adjusted depending on the amount of bandwidth required for the communication.

Figure 8:
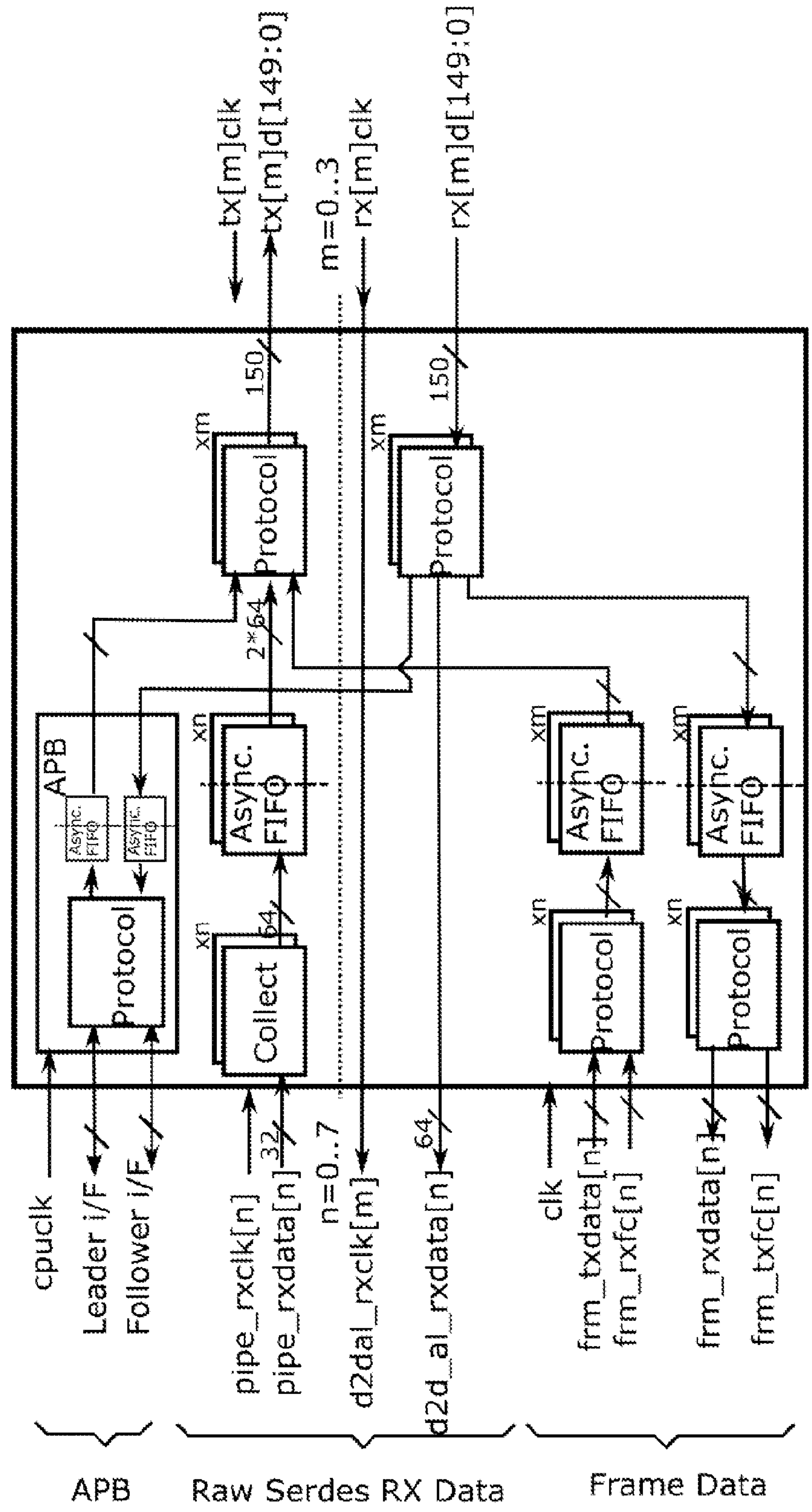
FIG. 8 is a block diagram of an adaptation layer for a D2D interconnect, in accordance with some embodiments.

FIG. 8 is a block diagram of an adaptation layer (AL) for an inter-die data interface, in accordance with some embodiments. The Adaptation Layer formats the payload sent and received over the high-speed die-to-die interconnect. As shown in FIG. 8, the Adaptation Layer supports the following types of payload:

1) Raw SERDES RX data (up to eight SERDES).
2) Frames/packets from link controllers (up to eight active interfaces) with support for flow control.
3) Indirect register-write and -read commands performed through the APB bus.

In the embodiment of FIG. 3, the retimers 305 and 310 may utilize the retimer data path shown in FIG. 5. In FIG. 5, data is routed over the D2D interface using an adaptation layer. In such an embodiment, raw data is sent over the D2D interface using the raw interface to minimize latency.

Raw Data Format

In some embodiments, each retimer circuit die includes eight PHYs. In some embodiments, all eight PHYs interface to a root complex and eight lanes of traffic are sent over the D2D interface. In such embodiments, the eight raw SERDES RX data interfaces are served in parallel. The eight frame interfaces may be served Round-Robin or in parallel depending on the protocol. The high-speed link is statically setup to either transmit raw SERDES RX data or frames of data. Indirect register accesses may be interleaved in both above traffic types.

As shown in FIG. 8, the raw SERDES RX data flow collects two 32-bit words of data from a SERDES over two consecutive receive clock cycles and writes the combined 64 bits of data into an asynchronous FIFO. The 64 bits of data from the asynchronous FIFO are sent on a specific data flow of the high-speed die-to-die link (e.g., one of the flows shown in FIG. 7). In the event that all eight lanes are sent over the D2D interface, the raw data collected from two RX SERDES asynchronous FIFOs are combined and sent on the same specific data flow of the high-speed link. If only four lanes of data are transmitted over the D2D interface, then the following scenarios may occur. In a first scenario, the data from two lanes are similarly combined over a single D2D flow, and as such, two D2D flows may be unused for data (and may still be used for T2T configurations, for example). In a second scenario, the data from each lane is sent over a respective D2D flow.

The raw data format (i.e., non-frame based protocol) is a format used to transfer raw 32-bit sets of SERDES data within each data flow clock cycle. The non-frame based protocol word is as follows:

| 149 | 148:0 |
|---|---|
| Protocol | Payload |

where the protocol bit is asserted 1'b1 for non-frame based protocol. As shown below in Table 1, Bits 148:0 of the payload field have a format of:

TABLE 1

| Field | bits | Description |
|---|---|---|
| RESERVE | 148:145 | Reserved for future use |
| SEQ | 144:139 | Incrementing sequence number. Only applicable for register commands.<br>One sequence counter per write and read command. The sequence number is incremented per read or write command. The sequence number for the<br>associated write or read command will be carried in the associated register data command. |
| TAG3 | 138:136 | Tag for PAYLOAD3 on how to interpret the field.<br>3'b000, 3'b001, 3'b010, 3'b011: TAG3[1:0] indicates the SERDES data flow offset number for SERDES data in PAYLOAD3.<br>3'b100: PAYLOAD3 contains the register address or future reserved messages<br>3'b101: PAYLOAD3 contains the register write data.<br>3'b110: PAYLOAD3 contains the register read data.<br>3'b111: PAYLOAD3 contains no valid data. |
| PAYLOAD3 | 135:104 | 32 bits of SERDES payload, register payload or message payload. TAG3 determines the format of PAYLOAD.<br>TAG3[2] = 1'b0:<br>32 bits of SERDES payload. Only applicable when VALID012 = 2'b11.<br>TAG3 = 3'b100: PAYLOAD3 carries register address.<br>PAYLOAD3[1:0] = 2'b00: Register write address.<br>PAYLOAD3[31:2]: Register word write address.<br>PAYLOAD3[1:0] = 2'b01: Register read address.<br>PAYLOAD3[31:2]: Register word read address.<br>PAYLOAD3[1:0] = 2'b10, 2'b11: Reserved for future messages.<br>PAYLOAD3[31:2]: Reserved.<br>TAG3 = 3'b101: PAYLOAD3 carries register write data.<br>PAYLOAD3: Register write data.<br>TAG3 = 3'b110: PAYLOAD3 carries register read data.<br>PAYLOAD3: Register read data.<br>TAG3 = 3'b111: PAYLOAD3 has no valid data. |
| VALID012 | 103:102 | Indicate how many PAYLOAD0-2 contains valid data. Data is ordered starting with PAYLOAD0.<br>2'b00: No valid data present in PAYLOAD0-2.<br>2'b01: PAYLOAD0 is valid.<br>2'b10: PAYLOAD0 & PAYLOAD1 are valid.<br>2'b11: PAYLOAD0, PAYLOAD1, & PAYLOAD2 are valid. |
| FLOWOFF2 | 101:100 | SERDES data flow offset number for PAYLOAD2. |
| PAYLOAD2 | 99:68 | 32 bits of SERDES payload |
| FLOWOFF1 | 67:66 | SERDES data flow offset number for PAYLOAD1. |
| PAYLOAD1 | 65:34 | 32 bits of SERDES payload. |
| FLOWOFF0 | 33:32 | SERDES data flow offset number for PAYLOAD0. |
| PAYLOAD0 | 31:0 | 32 bits of SERDES payload |

SERDES payload is a high priority payload type, register commands are medium priority, and future messages are low priority. The SERDES payload may be filled in a user data cycle starting with PAYLOAD0, followed by PAYLOAD1, etc. A register command is only inserted in the case that there is less than four SERDES payload data ready in the data flow cycle. A register command is only inserted in the PAYLOAD3 field. The register write address command is followed by a register write data command before a new register write address command is sent. A register read address command or register read data command may be inserted in between the register write address command and register write data command.

While the above description details a particular D2D interface as shown in FIGS. 7 and 8, it should be noted that other D2D interfaces may be utilized to convey PCIe traffic between circuit dies. In some embodiments, the D2D interface may refer to the Universal Chiplet Interconnect Express (UCIe) interface. UCIe includes several modes of operations including a FLIT-aware mode of operation that includes a die-to-die adapter to implement e.g., CXL/PCIe protocols. Further, UCIe includes a streaming protocol that offers generic modes of a user defined protocol to transmit raw data. In the multiple-endpoint switching embodiment described with respect to FIG. 3, such a streaming protocol may be utilized to convey data between circuit dies in the retimer mode of operation.

Load Distribution: Non-Load Balancing Mode

Transmitting payload over the D2D link in load balancing mode or non-load balancing mode is configurable and depends on the protocol. All data flows operate in one or the other mode. Non-load balancing mode is used when the D2D link transmits PCS payload data (raw SERDES data).

In raw SERDES mode, the payload data from a fixed set of lanes is statically setup for transmission over a specific D2D data flow. The 'logic lanes' in this context correspond to the adaptation layer physical ports, i.e., the ports to which the PHYs are mapped to via the raw MUX crossbar switch. To minimize further multiplexing logic, fixed mapping of logic lanes to data flows may be used. In one example, the mapping for eight lanes of traffic from the adaptation layer physical ports to the four die-to-die data flows is given below:

Logic lanes 0-1 map to data flow 0
Logic lanes 2-3 map to data flow 1
Logic lanes 4-5 map to data flow 2
Logic lanes 6-7 map to data flow 3

Such a mapping may also apply to non-SERDES payload data. The register commands and message payload are statically setup to use a specific data flow to minimize logic by only handling one command in one cycle. The messages payload may be configured to use a different data flow than for the register commands.

In custom frame-based mode, similar to raw SERDES mode, the lanes may be configured statically to the same specific D2D data flows given above. D2D link words are load distributed round-robin from the two frame interfaces per D2D data flow. Some embodiments may implement a minimum spacing between D2D link words for the same frame interface/port on the same data flow. In some embodiments, the minimum spacing may be four cycles.

Some embodiments may have programmability to run fixed TDM slots. In fixed TDM mode the transmitter constantly sends words for the four supported ports, e.g., Port #0, Port #1, Port #2, Port #3, Port #0, Port #1, etc. If a port does not have payload to send in a slot it sends an IDLE cycle. Some embodiments may also implement programmability for the number of ports in the TDM calendar. The register commands and message payload may also be statically setup to use a specific D2D data flow to minimize logic by only handling one command in one cycle, similar to the raw SERDES mode. The messages payload may be configured to use a different data flow than the register commands.

APB Leader/Follower Interface

As shown in the adaptation layer block diagram of FIG. 8, the D2D interface includes an APB follower interface and an APB leader interface. The APB follower interface is the interface to all the configuration registers of the adaptation layer including configuration registers to set up the tile-to-tile (T2T) read/write transactions. The T2T transactions are indirect register read and write commands sent over the D2D link. The source of the T2T transactions is the adaptation layer on the leader tile. The destination of the T2T transactions is the adaptation layer on the follower tile which translates the received T2T read/write commands to an APB read/write transaction. Both the APB follower and leader interface have command FIFOs whereas only the APB leader interface has a read return FIFO. The number of entries in the two types of FIFOs can be independent, however, at least one embodiment configures them to be equal size.

The APB leader interface executes the receive T2T read/write commands on the APB in the follower tile. For read commands, the corresponding read return data is transmitted back to the leader tile on the D2D link. The command FIFO in the APB leader interface allows for a number of outstanding writes that may take some time to execute on the follower tile. Firmware guarantees that the command FIFO does not overrun. The fill level of the FIFO may be read in a register, however firmware can guarantee no overrun occurs by adding delay between T2T write transactions, or by performing a read and waiting for the read data after having sent a maximum number of back-to-back T2T write transactions, where the maximum number is defined by the number of command FIFO entries minus one. The T2T read transaction is used to flush the command FIFO since commands do not overtake each other. The APB leader interface is idle on the leader tile, i.e., it never receives T2T transactions from the follower tile. The APB follower interface on the follower tile is used to access the adaptation registers, yet no T2T transactions are initiated from the follower tile.

T2T Transactions

In some embodiments, the D2D interface includes sufficient bandwidth to accommodate in-band data transfer used by a leader tile of a MCM e.g., to configure another retimer tile or a DPU/accelerator device connected via the D2D interface. The T2T transactions are word addresses, i.e., address bits 1:0 are zero. Write and read order are guaranteed for T2T transactions. No write or read to a register on the follower tile can overtake another write or read to the same register on the follower tile. Five configuration registers are used to control the T2T transactions in the leader tile, given below in Table 2:

TABLE 2

| Name | Bitwidth | Access Type | Description |
|---|---|---|---|
| AL_T2T_WADDR | 30 | W | Write word address |
| AL_T2T_WDATA | 32 | W | Write Data. An access to this register starts a T2T write command using the address in AL_T2T_WADDR. The AL_T2T_WADDR is auto incremented to the next consecutive word address. |
| AL_T2T_RADDR | 30 | W | Read word address. An access to this register starts a T2T read command at the AL_T2T_RADDR. |
| AL_T2T_RDATA | 32 | R | Read return data. Only valid when AL_T2T_RENTRY is non zero. When the register is read and AL_T2T_RENTRY is non zero, the read return FIFO is dequeued. |
| AL_T2T_CENTRY | 3 | R | Indicate number of pending commands in command FIFO |
| AL_T2T_RENTRY | 3 | R | Indicate number of valid read return data in the read return FIFO |

In some embodiments, the AL_T2T_CENTRY field and AL_T2T_RENTRY fields are located at the same register address to speed up accesses by being able to read both fields in one operation.

The CPU on the leader tile performs the following APB transactions to configure register in the adaptation layer to perform a register write in a follower tile over the D2D link:

1) Write follower tile APB register address value to AL_T2T_WADDR.
2) Write follower tile corresponding write data value to AL_T2T_WDATA to start the write command. Writing the AL_T2T_WDATA auto increments the AL_T2T_WADDR register.
3) Repeat step 2) if consecutive APB addresses on the follower tile are written.

Step 3) may be repeated as long as the firmware guarantees no overrun of the command FIFO occurs as mentioned above. Some embodiments may support a configuration bit to disable auto-increment of the AL_T2T_WADDR. In such an embodiment, the bit may be located as a new field at the same address as the AL_T2T_WADDR field.

The CPU on the leader tile performs the following APB transaction to configuration registers in the adaptation module to perform a register read operation in a follower tile over the D2D link:

1) read the AL_T2T_RENTRY register (unless the value is known from a previous read).
2) Write follower tile APB register address value to AL_T2T_RADDR to start the read command. Up to seven AL_T2T_RENTRY read outstanding read commands may be started before moving to the next step.
3) Wait for read return data by polling the AL_T2T_RENTRY register. Once a non-zero is read the value indicates the number of valid 32-bit data words are ready in the read return FIFO.
4) Perform up to AL_T2T_RETNERY reads from the AL_T2T_RDATA register to obtain the follower tile read data.

Figure 11:
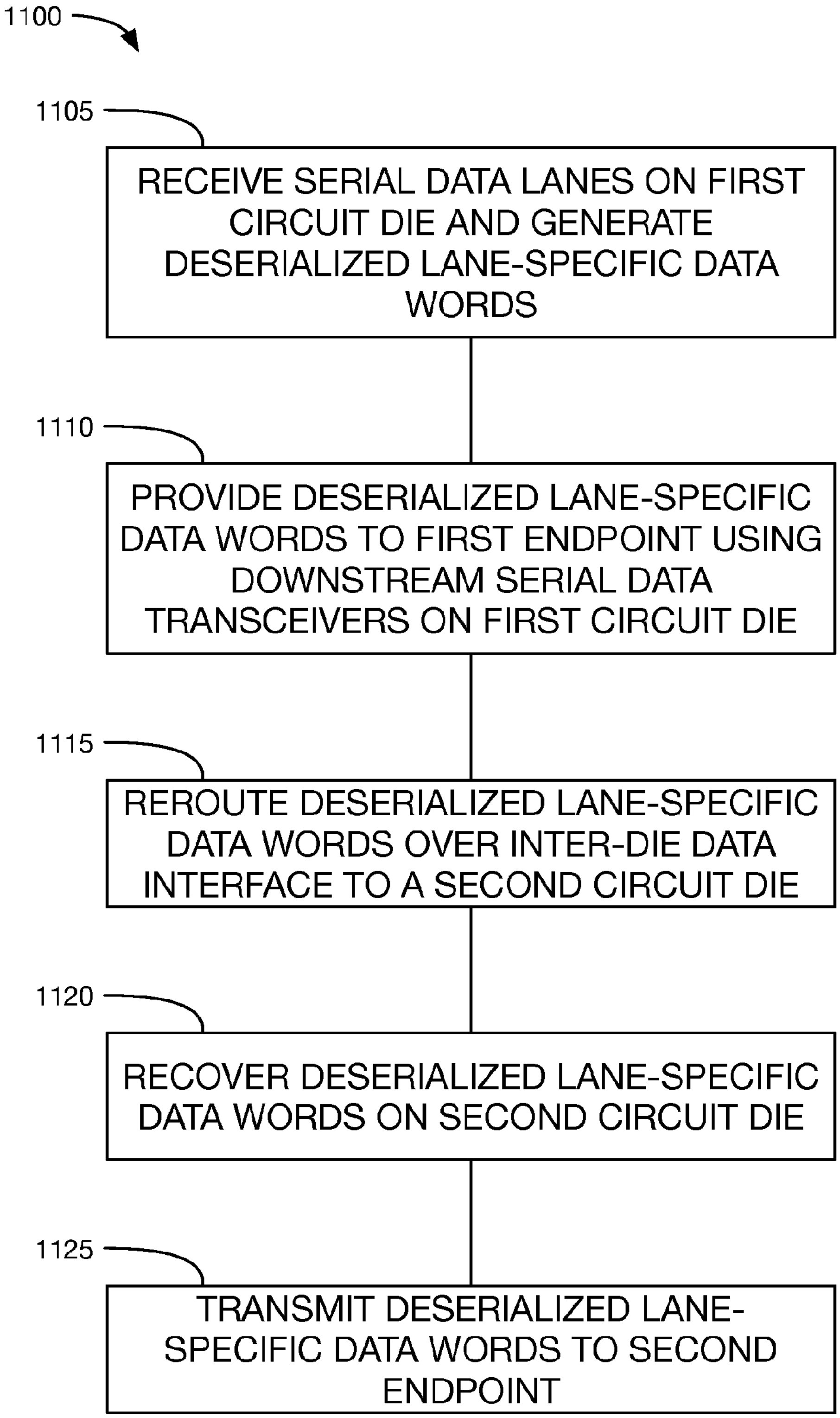
FIG. 11 is a flowchart of a method, in accordance with some embodiments.

FIG. 11 is a flowchart of a method 1100, in accordance with some embodiments. As shown, method 1100 includes receiver 1105, at a plurality of upstream serial data transceivers of a first circuit die of a multi-die integrated circuit module (ICM), a plurality of serial data lanes associated with a PCIe data link, and responsively generating respective deserialized lane-specific data words. The method further includes providing 1110 the deserialized lane-specific data words for transmission via a group of downstream serial data transceivers on the first circuit die of the multi-die ICM, the group of downstream serial data transceivers having a PCIe data link to a first endpoint. The method further includes rerouting 1115, responsive to a failure in the PCIe data link to the first endpoint, the deserialized lane-specific data words over an inter-die data interface using an inter-die adaptation layer protocol to a second circuit die of the multi-die ICM. The method further includes recovering 1120, the deserialized lane-specific data words at the second circuit die from the inter-die data interface. The method further includes transmitting 1225 the deserialized lane-specific data words via a second group of downstream serial data transceivers to a second endpoint via a second PCIe data link.

In some embodiments, the method 1100 further includes detecting the failure in the PCIe data link at least in part using a BMC. In such embodiments, the deserialized lane-specific data words are rerouted responsive to receiving an instruction from the BMC. In some embodiments, the instruction is received via a system management bus (SMBus). The BMC may monitor lane status between the group of downstream serial data transceivers and the first endpoint using the BMC. In some embodiments, the BMC monitors performance of the first endpoint using the BMC. Some performance characteristics indicative of performance monitored by the BMC may include, but are not limited to: bit error rate, temperature, humidity, fan speeds, supply voltages, amongst other parameters.

In some embodiments, the failure in the PCIe data link is associated with a lane break associated with the group of downstream serial data transceivers having the PCIe data link to the first endpoint. Such a lane break may be e.g., a faulty trace, wire, or cable interconnecting the retimer to the endpoint. In some embodiments, detection of such a lane break may involve e.g., a timeout being initiated by a retimer training and status state machine (RTSSM). The timeout may be initiated responsive to the downstream pseudo-port of the retimer no longer receiving inbound data for a predetermined period of time. Alternatively, the timeout may be initiated via an instruction from the first endpoint indicating the first endpoint is no longer receiving outbound data for a predetermined period of time. The instruction from the first endpoint may be received by the retimer and/or the BMC via the system management bus (SMBus).

We claim:

1. A method comprising:

receiving, at a plurality of upstream serial data transceivers of a first circuit die of a multi-die integrated circuit module (ICM), a plurality of serial data lanes associated with a PCIe data link, and responsively generating respective deserialized lane-specific data words;

providing the deserialized lane-specific data words for transmission via a group of downstream serial data transceivers on the first circuit die of the multi-die ICM, the group of downstream serial data transceivers having a PCIe data link to a first endpoint;

responsive to a failure in the PCIe data link to the first endpoint, rerouting the deserialized lane-specific data words over an inter-die data interface using an inter-die adaptation layer protocol to a second circuit die of the multi-die ICM;

receiving the deserialized lane-specific data words at the second circuit die from the inter-die data interface; and transmitting the deserialized lane-specific data words via a second group of downstream serial data transceivers to a second endpoint via a second PCIe data link.

2. The method of claim 1, further comprising detecting the failure in the PCIe data link at least in part using a board management controller (BMC), and wherein the deserialized lane-specific data words are rerouted responsive to receiving an instruction from the BMC.

3. The method of claim 2, wherein the instruction is received via a system management bus (SMBus).

4. The method of claim 2, further comprising monitoring lane status between the group of downstream serial data transceivers and the first endpoint using the BMC.

5. The method of claim 2, further comprising monitoring performance of the first endpoint using the BMC.

6. The method of claim 5, wherein detecting the lane break comprises initiating claim 1, further comprising detecting a lane break based on a timeout generated by a retimer training and status state machine (RTSSM).

7. The method of claim 6, wherein the timeout is initiated generated responsive to no longer receiving inbound data for a predetermined period of time.

8. The method of claim 6, wherein the timeout is initiated generated via an instruction from the first endpoint indicating the first endpoint is no longer receiving outbound data for a predetermined period of time.

9. The method of claim 8, wherein the instruction from the first endpoint is received via a system management bus (SMBus).

10. The method of claim 1, wherein the failure in the PCIe data link is associated with a monitored bit error rate exceeding a threshold value.

11. The method of claim 1, wherein the failure in the PCIe data link is associated with a lane break associated with the group of downstream serial data transceivers having the PCIe data link to the first endpoint.

12. The method of claim 11, further comprising detecting the lane break using a BMC.

13. An apparatus comprising:

a plurality of upstream serial data transceivers of a first circuit die of a multi-die integrated circuit module (ICM), the plurality of upstream serial data transceivers configured to receive a plurality of serial data lanes associated with a PCIe data link, and to responsively generate respective deserialized lane-specific data words;

a group of downstream serial data transceivers on the first circuit die configured to transmit the deserialized lane-specific data words, the group of downstream serial data transceivers having a PCIe data link to a first endpoint;

lane-routing logic on the first and second circuit dies configured to reroute the deserialized lane-specific data words over an inter-die data interface using an inter-die adaptation layer protocol to a second circuit die of the multi-die ICM responsive to a failure in the PCIe data link to the first endpoint;

the second circuit die configured to recover the deserialized lane-specific data words from the inter-die data interface, the second circuit die comprising a second group of downstream serial data transceivers configured to transmit the deserialized lane-specific data words to a second endpoint via a second PCIe data link.

14. The apparatus of claim 13, further comprising a board management controller (BMC) configured to detect the failure in the PCIe data link.

15. The apparatus of claim 14, wherein the BMC is configured to provide an instruction to a central processing unit (CPU) on one of the first or second circuit dies of the multi-die ICM to configure the lane-routing logic to reroute the deserialized lane-specific data words.

16. The apparatus of claim 14, wherein the BMC is further configured to monitor lane status between the group of downstream serial data transceivers and the first endpoint.

17. The apparatus of claim 14, wherein the BMC is further configured to monitor performance of the first endpoint.

18. The apparatus of claim 13, wherein one of the first and second circuit dies of the multi-die ICM comprises a central processing unit (CPU) configured to receive an instruction via a system management bus (SMBus), the CPU configuring the lane-routing logic on the first and second circuit dies to reroute the deserialized lane-specific data words.

19. The apparatus of claim 13, wherein the failure in the PCIe data link is associated with a lane break associated with the group of downstream serial data transceivers having the PCIe data link to the first endpoint.

20. The apparatus of claim 19, further comprising a retimer training and status state machine (RTSSM configured to detect the lane break and to initiate a timeout.

21. The apparatus of claim 20, wherein the timeout is initiated responsive to the first circuit die no longer receiving inbound data for a predetermined period of time.

22. The apparatus of claim 13, wherein the first endpoint is configured to issue a timeout indicating the first endpoint is no longer receiving outbound data for a predetermined period of time.

* * * * *